United States Patent [19]

Skrivan et al.

[11] 3,856,918

[45] Dec. 24, 1974

[54] PROCESS FOR THE BENEFICIATION OF TITANIFEROUS ORES UTILIZING HOT WALL CONTINUOUS PLASMA REACTOR

[75] Inventors: Joseph Francis Skrivan; John Donald Chase, both of Stamford, Conn.

[73] Assignee: American Cyanamid Company, Stamford, Conn.

[22] Filed: Mar. 28, 1973

[21] Appl. No.: 345,606

[52] U.S. Cl. .................. 423/69, 423/610, 204/164, 423/493, 423/633, 75/295, 75/63
[51] Int. Cl. ............................................ C01g 23/04
[58] Field of Search ............ 423/610, 69, 493, 633; 204/164

[56] References Cited
UNITED STATES PATENTS

| | | |
|---|---|---|
| 3,429,665 | 2/1969 | Evans et al. .................. 423/610 X |
| 3,446,590 | 5/1969 | Michal et al. .................. 423/610 X |
| 3,649,189 | 3/1972 | Kugler et al. .................. 204/164 X |
| 3,787,139 | 1/1974 | Oster .................................. 423/610 |

*Primary Examiner*—Edward Stern
*Attorney, Agent, or Firm*—Harry H. Kline

[57] ABSTRACT

There is provided a process for the beneficiation of titaniferous ores utilizing a plasma jet to carry out the high temperature reduction of the oxides of iron with a hydrocarbon gas in a hot wall continuous plasma reactor which enables particulate solids to be recovered. Iron can readily be removed by leaching or magnetic separation of the particulate solids so as to obtain a feed product containing 90–97 percent titania which is eminently suitable as a feed material for manufacturing titanium dioxide pigment by the chloride process.

8 Claims, 1 Drawing Figure

PATENTED DEC 24 1974
3,856,918
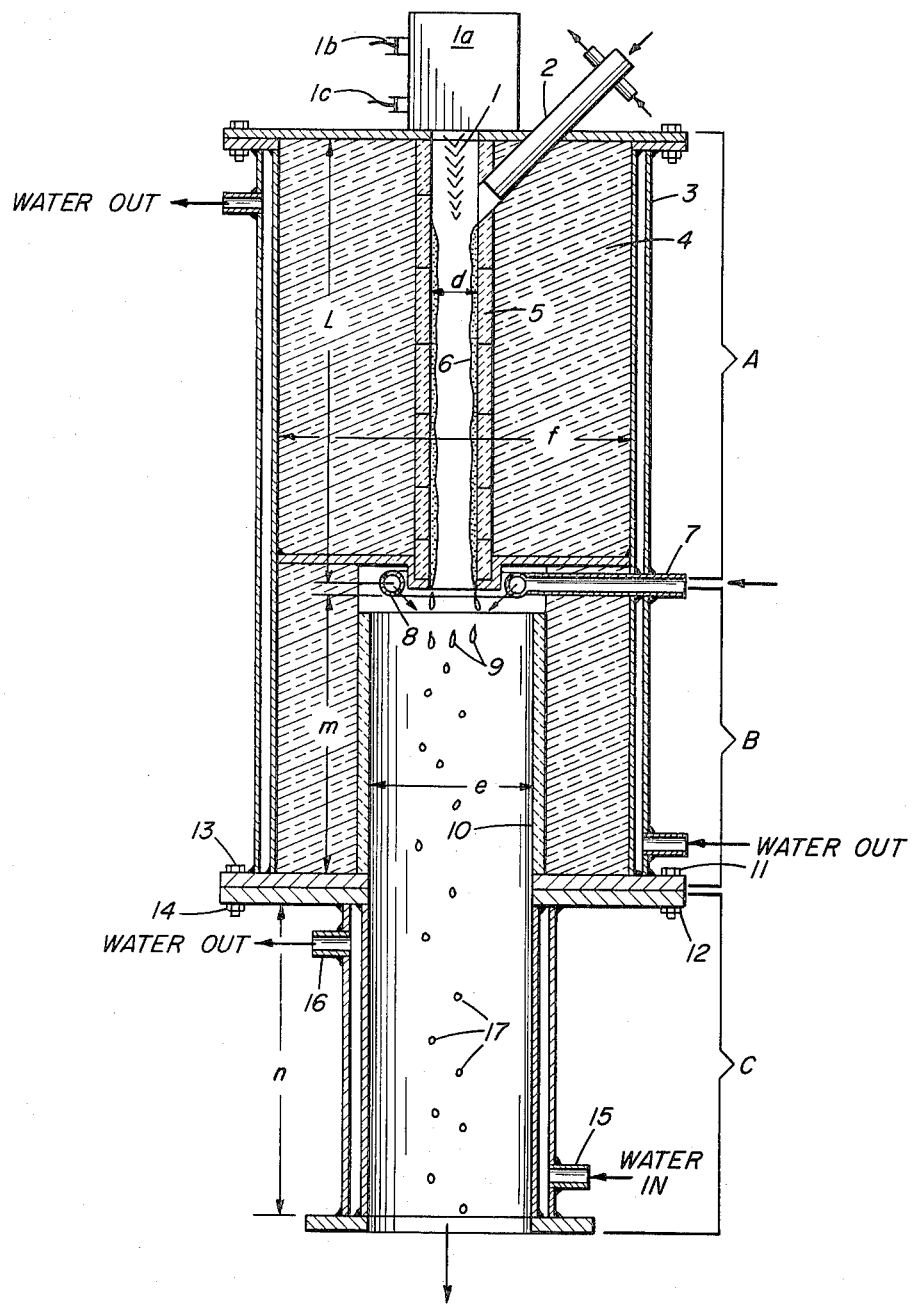

PROCESS FOR THE BENEFICIATION OF TITANIFEROUS ORES UTILIZING HOT WALL CONTINUOUS PLASMA REACTOR

The present invention relates to a novel hot wall continuous plasma reactor eminently suitable for processing a low-grade titaniferous ore to recover particulate solids having a high titania content. More particularly, the invention is concerned with a hot wall plasma jet reactor and a continuous process for utilizing a reactor which causes a titaniferous ore to melt and flow on the reactor walls and then quenching the same, whereby particulate solids containing from 90 percent to 97 percent, or higher, of titania from a low grade titaniferous ore are realized.

As is known, low-grade titaniferous ores, such as ilmenite and leucoxene, usually contain up to about 45 percent iron oxides. These have been variously treated to recover titanium oxide or titanium metal. However, to the present, none of the methods is entirely satisfactory, since a $TiO_2$ product of about 72 percent – 75 percent can be obtained after such processing. The latter method involves for instance the reduction of ilmenite ore with carbon in an electric arc furnace to yield molten iron and a titanium rich slag which can be further processed to recover pigment, titania or titanium metal. Another method involves the oxidation of ferrous iron in ilmenite ore to the ferric state by roasting, followed by a reduction step to yield metallic iron which is removed by leaching. Unfortunately, such processes require very large capital investment. Moreover, to mimimize the consumption of chlorine and to utilize a titaniferous beneficiated ore, the latter should contain at least about 90 percent $TiO_2$. Where plasma jet processes have been suggested, there have been obtained products of not over 80 percent $TiO_2$ which cannot be economically employed as a feed to a chlorinator in a $TiO_2$ processing plant. If a procedure and an apparatus could be economically developed to beneficiate a low-grade titaniferous ore so as to obtain a feed material containing at least as high as 90 percent $TiO_2$ suitable for use in a chlorinator of a $TiO_2$ plant, such would fulfill a long felt need in the art.

It is, therefore, a principal object of the invention to provide a continuous method for upgrading a low-grade titaniferous ore, whereby particulate solids which can be leached to remove iron are obtained for use in a chlorinator of a $TiO_2$ plant. It is a further object to provide a reactor to effect the continuous preparation of upgrading a low-grade titaniferous ore to obtain leachable particulate solids. It is a still further object of the invention to provide particulate solids containing not less than about 90 percent $TiO_2$. Other objects and advantages will be ascertained from a reading of the ensuing description.

To these ends, it has been unexpectedly found that upgraded titaniferous ore feed material containing not less than about 90 percent $TiO_2$ can be attained in a straightforward process involving the use of a hereinafter defined hot wall, continuous plasma jet reactor. In brief, however, ground titaniferous ore, such as ilmenite or leucoxene, is introduced at the top of a vertical refractory wall reactor into which is introduced the effluent of a plasma torch or arc operating on hydrogen or a hydrocarbon, such as methane. The plasma arc provides sufficient heat to melt the ore and heat both the reactor and the reductant gases. Continuous operation is assured utilizing a hot wall reactor. This reactor, in general, comprises a vertical tube which is well insulated so as to promote the melting of the ore particles in a manner such that the liquid flows down the inside of the reactor wall. At the base of the reactor, the molten slag is rapidly quenched by dropping into a cooled-wall receptacle. The rapid quench is accomplished by means of an inert gas which serves to convert the molten film flowing down the upper walls into droplets of slag. At the same time, the rapid quench causes attrition and solidification of phases which will subsequently render them more leachable. The solidified droplets of slag are in a form which can be easily ground, if that is necessary, to permit magnetic separation of metallic iron of that portion of the iron which was reduced in the reactor. After removal of the metallic iron, the remaining iron is leached with hydrochloric acid. Most of the remaining iron is so leached out to produce a solid that contains at least 90 percent $TiO_2$. A hydrolysis step is employed to recover the hydrochloric acid by converting iron chloride to iron oxide.

The reactor will be more completely described by reference to the accompanying drawing in which the sole FIGURE is a vertical section of the apparatus of the invention showing three zones, namely, an upper hot wall reactor zone identified as A, a middle reactor base zone, identified as B, and a lower cool wall zone, identified as C. Into zone A are introduced a reducing gas plasma, such as methane, hydrogen or a mixture of hydrogen and argon, at 1.

This reducing gas plasma which is maintained at a temperature ranging from about 8000°F. is produced in an arc heater or plasma torch 1a by passing the reducing gas between electrodes which are connected to electrical power leads 1b and c. The latter reducing gas contacts a ground, low-grade titaniferous ore admixed with a carrier gas, such as methane, hydrogen, or recycled product gas comprising a mixture of hydrogen and carbon monoxide fed through a water-cooled feed probe 2, positioned at an angle of from about 22.5° to 67° to the vertical interior wall, and preferably at 45° to the vertical. The reactor zone is cooled externally by means of a water-cooled jacket 3, and thermally insulated at 4. The so-introduced titaniferous ore is melted and flows on the walls of the hot wall alumina reactor 5, remaining thereon as molten slag 6 for a period of at least about 0.01 minute, or longer, and usually from about 0.05 minute to about 5.0 minutes, and flows down as molten slag 6. As the molten slag leaves the walls of the reactor zone A, it is met by a stream of quench gas at the base of the hot wall reactor so as to break up the molten film into small drops. In general, the ratio of the length 1 to diameter d of the hot wall reactor A should be at least 3 and, preferably, greater than 5, say in the range between about 6 and about 20. The length of each section of the alumina reactor wall is small enough such that thermal cracking does not occur. Usually, section lengths of from one to three inches are employed.

As stated above, the ground ore is suspended in a stream of methane and fed through a water-cooled probe 2 through an opening in the side of the hot wall reactor. The direction of the probe and feed stream is preferably positioned about 45° from the axis of the reactor such that the jet of suspended ore contacts the hot reactor wall opposite from its point of entry.

The reactor base zone B is of sufficient length $m$ such that the bottom of the reactor remains at a temperature above the melting point of the slag. Solidification and plugging of the reactor are thereby avoided. There is introduced a quench gas, such as recycled hydrogen and carbon monxide at inlets 7 emanating through a quench ring with slot at 8, whereby drops of the molten slag are formed at 9, which drops do not impinge or dwell on the reactor base zone's walls 10 fabricated from graphite. This zone together with the above zone is externally water-cooled.

The heat exchanger section or cooling zone C, fabricated, for instance, from any conventional ferrous metal such as steel or equivalent thereof is secured to zone B and attached thereto by means of nuts and bolts at 11, 12 and 13, 14, respectively, as well as providing for water cooling at 15 and 16 through a water-cooled jacket. Conversion to discrete, unconsolidated solid particles occurs at 17. These can be readily separated from the gas suspension by any conventional means, such as a cyclone.

As previously stated, the reactor base zone B should be of sufficient length $m$ so as to prevent plugging of the reactor by cooling to the downstream cold end of the reactor. It is advantageous to use a ratio of reactor length L in reactor base zone to reactor base zone length $m$ equal to or greater than 1. Graphite is found to be the preferable material of construction. Significantly, the diameter $e$ of the reactor base wall in zone B should be large enough to prevent any contact between the wall and molten drops passing through the reaction base zone B. Hence, the ratio of the reactor base wall diameter $a$ to the hot reactor wall diameter $d$, namely, $e/d$, should be greater than 3, and preferably between 4 and 10.

To minimize heat losses from the hot wall reactor to the water-cooled metal housing of the reactor, a low density fibrous alumina insulation 4 is employed. The thickness of the insulation should be at least one foot to attain maximum efficiency of operation.

In general, the reactor in zone A, must initially withstand temperatures in excess of 1450°C. which is the melting point of ilmenite and should not be attacked chemically by contact with molten slag or a reducing atmosphere. Illustrative of materials of construction meeting the above requirements are alumina and titania.

With respect to the introduction of quench gas at 7, the amount employed and the manner in which it is admitted can be varied. For instance, a rapid thermal quench is provided in order to break up the film or sheets of slags dropping from the reactor to cause the slag to solidify into discrete droplets. The quench serves also to enhance solidification of the solid phases in the slag which can be subsequently leached with acid, usually hydrochloric acid. Such droplets are easier to grind and leach than would be possible where normally solidification into larger spheres or lumps occurs.

In a preferred quench method there is introduced a high velocity gas at the base of the reactor and perpendicular to the reactor axis. For best operation, the quench gas flow is adjusted such that the momentum of the gas flow is at least ten (10) times the momentum of the falling sheet of molten slag one inch below the reactor in accordance with the following formula:

lb/hr of quench gas x velocity of quench gas/lb/hr of slag x velocity of dropping slag = at least 10

The length $n$ of the heat exchanger zone C should be more than one foot and, preferably, greater than three feet so that the drops of condensed phase product, namely $TiO_2$, metallic iron, and partially reduced oxides or iron have cooled and solidified during the time required for it to pass through the heat exchanger. Insulation is not included between the inside of the heat exchange zone and the water-cooled wall. Since a large quantity of heat is removed in the heat exchanger, some of the heat could be profitably utilized to preheat the titaniferous ore and the methane feed material introduced in zone A.

Illustrative of the plasma torch which can be used herein is one operated on d.c. power having a thoriated tungsten cathode and an annular copper anode nozzle. The torch is commercially available, one of which is model H50 A manufactured by the Thermal Dynamics Corporation of New Hampshire.

The operation of the aforementioned exemplary rereactor will be further illustrated by way of the following example which are to be taken merely as illustrative and not by way of limitation.

EXAMPLE 1

Ilmenite ore with a titanium and iron content expressed as $TiO_2$ and $Fe_2O_3$ of 69 percent and 30.5 percent, respectively, was ground to $-70 + 200$ mesh and suspended at a rate of 60 grams per minute into a stream of 0.37 g-moles/min of methane and introduced at a 45° angle to the reactor axis at the top of a plasma reactor as defined in the drawing above. Heat was added with a d.c. plasma torch (model H50 A of the Thermal Dynamics Corporation). The torch was attached to the top of the reactor housing such that the effluent of the plasma torch, that is the plasma jet, was directed downward along the reactor axis. The plasma gas consisted of a mixture of 1.51 g-moles/min of argon and 0.64 g-moles/min hydrogen. The d.c. power input to the torch was 31.5 kw. The reactor was constituted of 5 two-inch long, three-inch i.d. sections of high purity alumina tubing assembled in such a manner as to comprise a vertical 10-inch long reactor. The reactor tube was thermally insulated with fibrous alumina from the 15-inch diameter water-cooled heat exchanger in which solid and gaseous products were cooled during passage through the tube. Fine particles were separated from the product gas located at the exit of the heat exchanger section. The product gases were then bubbled through a water tank and diluted with nitrogen to eliminate explosion hazard prior to exhausting to atomosphere.

Before commencing a 70-minute duration run, the reactor was heated for one and one-half hours at a torch power input of 20 kw. After terminating the run and allowing the system to cool, the solidified slag was removed from the bottom of the heat exchanger. In this run where no quench gas was used, the slag was mainly in the form of 1/16 – ¼inch diameter rounded lumps. Also mixed with this slag were iron spheres 1/16 inch, or less, in diameter. These iron spheres were first magnetically separated from the slag. The slag was then ground to -100 mesh in a pulverizing mill and the metallic iron was again separated magnetically. Since virtually all of the slag material is partially magnetic, the magnet was passed over the solids at sufficient distance such that only the most highly magnetic metallic particles were removed.

The major, non-magnetic portion of the solids was added to a flask containing twice as much 6 normal hydrochloric acid as required to leach all the iron in the ore to ferric chloride. The flask was fitted with a reflux condenser and a heating jacket and the solids were leached with boiling 6N HCl for two hours at ambient pressure. After filtering and washing, the solids were analyzed for iron and titanium using atomic absorption spectroscopy for iron and a colorimetric technique for titanium. The titanium and iron content of the leached solid reported as $TiO_2$ and $Fe_2O_3$ are 90.6 percent and 8.75 percent, respectively.

EXAMPLE 2

Thirty g/min of leucoxene with a titanium and iron content expressed as $TiO_2$ and $Fe_2O_3$ of 79 and 20.5 percent, respectively, and ground to $-70 + 200$ mesh was suspended in a stream of 0.133 g-moles/min methane and introduced to a reactor as in Example 1. In addition to the foregoing, the conditions and procedure for the present example are similar to those described in Example 1 except for the following: The d.c. power to the torch was 29 percent kw. The run duration was 90 minutes. A nitrogen quench gas flow of 0.088 g-moles/min was directed through a 1/32 inch wide inward-facing slot one-inch below the base of the reactor. The ratio of momentum of quench gas to momentum of dropping slag equal to 50 is established. Most of the slag solidified in spheres of 1/16 inch diameter or smaller. Analysis of the solid product after being leached as described in Example 1 and reported as $TiO_2$ and $Fe_2O_3$ are 91.8 percent and 6.6 percent, respectively.

EXAMPLE 3

Sixty g/min of leucoxene with titanium and iron content expressed as $TiO_2$ and $Fe_2O_3$ of 79 percent and 20.5 percent, respectively, and ground to $-70 + 200$ mesh was suspended in a stream of 0.26 g-moles/min of argon and introduced into a reactor as in Example 1. The conditions and procedures for the present example are similar to those described in Example 1, except for the following: The plasma gas employed was methane rather than a mixture of hydrogen and argon and was fed to the torch at the rate of 1.8 g-moles/min and power to the plasma torch was 36.2 kw. A 15-inch long, 3-inch i.d. single piece graphite reactor was used. Run duration was 45 minutes. A nitrogen quench gas flow of 0.112 g-moles/min was directed through a 1/32 inch-wide inward-facing slot at 1 inch below the base of the reactor. The ratio of momentum of quench gas to momentum of dropping slag equal to 20 is established. Approximately 85 percent of the slag solidified in spheres 1/16 inch diameter or smaller. Analysis of titanium and iron in the solid product following leaching was 93.1 percent $TiO_2$ and 5.4 percent $Fe_2O_3$, 93.1 percent and 5.4 percent, respectively.

We claim:

1. A process for beneficiating titaniferous ores utilizing a hot wall continuous plasma jet reactor adapted for the production of at least a 90 percent $TiO_2$ material having in combination a vertically positioned, elongated, water-cooled casing having an upper hot wall reactor zone, a middle reactor base zone, and a lower cool wall zone, said upper hot wall reactor zone having means for introducing a plasma reducing gas, means for introducing titaniferous feed material into the latter chamber on which molton slag flows, said reactor zone having a length to diameter ratio greater than 3; said middle reactor base zone having a vertical chamber of diameter equal to at least three times that of the diameter in said upper hot wall reactor zone, and means for quenching said molten slag immediately emanating from the said upper reaction zone so as to form discrete drops or particles; and said lower cool-wall zone having a water-cooled chamber, which comprises the steps of: introducing a ground low-grade titaniferous ore comprising titanium and iron values into a reaction zone of said plasma jet reactor where oxides of iron in the ore are partially or completely reduced by hot hydrocarbon gas in which the length to diameter ratio of the reaction zone is at least 3, contacting and melting said ore with a reducing gas effluent of a plasma torch or arc for a period from 0.01 to 5.0 minutes, flowing molten ore predominantly on the walls of said reaction zone, quenching the molten ore at the base of the said upper reaction zone so as to break-up molten ore into droplets thereby solidifying the molten ore after said quench in a reactor base zone, effecting free fall of the so broken-up and solidified material through said reactor base zone without touching the wall of said latter reactor, and recovering said solidified droplet containing at least about 90 percent $TiO_2$.

2. The process according to claim 1 wherein the solidified droplets are leached with hydrochloric acid to remove iron values from said droplets.

3. The process according to claim 1 wherein the solidified droplets are magnetically treated to remove iron values therefrom.

4. The process according to claim 2 wherein the hydrochloric acid leached solidified droplets are hydrolyzed to recover a product ranging from 90 percent – 97 percent $TiO_2$ as particulate solids.

5. the process according to claim 1 where the reducing gas effluent of the plasma torch is a hydrocarbon.

6. The process according to claim 1 where the reducing gas effluent of the plasma torch is methane.

7. The process according to claim 1 where the reducing gas effluent of the plasma torch is hydrogen.

8. The process according to claim 1 where the solidified droplets of slag are less than 1/16 inch in diameter.

* * * * *

UNITED STATES PATENT OFFICE
CERTIFICATE OF CORRECTION

Patent No. 3,856,918   Dated December 24, 1974

Inventor(s) Joseph Francis Skrivan et al.

It is certified that error appears in the above-identified patent and that said Letters Patent are hereby corrected as shown below:

Column 2, line 32, after "8000°F." insert -- to about 20,000°F. --.
Column 3, line 33, Change "a" to -- e --.
Column 4, line 7, Change "or" to -- of --.
Column 4, line 23, Change "example" to -- examples --.

Signed and Sealed this sixth Day of January 1976

[SEAL]

Attest:

RUTH C. MASON
Attesting Officer

C. MARSHALL DANN
Commissioner of Patents and Trademarks